United States Patent [19]
Kwatinetz

[11] Patent Number: 5,495,566
[45] Date of Patent: Feb. 27, 1996

[54] SCROLLING CONTENTS OF A WINDOW

[75] Inventor: Andrew Kwatinetz, Seattle, Wash.

[73] Assignee: Microsoft Corporation, Redmond, Wash.

[21] Appl. No.: 343,780

[22] Filed: Nov. 22, 1994

[51] Int. Cl.⁶ ..................................................... G06F 3/14
[52] U.S. Cl. ............................................................. 395/157
[58] Field of Search .................................... 395/157, 156, 395/159, 161; 345/118, 119, 157

[56] References Cited

U.S. PATENT DOCUMENTS

| | | | |
|---|---|---|---|
| 4,313,113 | 1/1982 | Thornburg | 340/709 |
| 4,789,962 | 12/1988 | Berry et al. | 364/900 |
| 4,794,386 | 12/1988 | Bedrij et al. | 345/119 |
| 4,831,556 | 5/1989 | Oono | 364/521 |
| 4,984,152 | 1/1991 | Muller | 364/521 |
| 5,155,806 | 10/1992 | Hoeber et al. | 395/157 |
| 5,157,768 | 10/1992 | Hoeber et al. | 395/157 |
| 5,169,342 | 12/1992 | Steele et al. | 434/112 |
| 5,196,838 | 3/1993 | Meier et al. | 345/118 |
| 5,299,307 | 3/1994 | Young | 395/161 |
| 5,313,229 | 5/1994 | Gilligan et al. | 345/157 |
| 5,373,309 | 12/1994 | Totsuka et al. | 345/145 |
| 5,374,942 | 12/1994 | Gilligan et al. | 345/157 |

Primary Examiner—Raymond J. Bayerl
Assistant Examiner—Ruay Lian Ho
Attorney, Agent, or Firm—Seed and Berry

[57] ABSTRACT

An improved method and system is provided for scrolling contents of a window. In accordance with a first aspect of the present invention, variable speed scrolling is provided when scrolling beyond a screen boundary. In accordance with the first aspect of the present invention, the variable speed is proportional to the acceleration of the mouse cursor. In accordance with a second aspect of the present invention, variable speed scrolling is provided when scrolling beyond a screen boundary. The variable speed of the second aspect of the present invention is inversely proportional to a number of times that scrolling has been initiated. In accordance with a third aspect of the present invention, an improved method and system for scrolling in response to navigation key input is provided. In accordance with the third aspect of the present invention, a scrolling mode is selected after examining navigation key input. When the navigation key input comprises more than a predefined number of keys with each key being received within a predefined period of time, the third aspect of the present invention performs jump to scrolling. If there are less than the predefined number of keys or the keys are not within the predefined time period, the third aspect of the present invention performs animated scrolling.

26 Claims, 9 Drawing Sheets

SCROLLING CONTENTS OF A WINDOW

TECHNICAL FIELD OF THE INVENTION

The present invention relates generally to data processing systems and, more particularly, to scrolling contents of a window in data processing systems.

BACKGROUND OF THE INVENTION

In the field of computer technology, a window is used for providing a user with access to information. In addition to providing access to the information, the window has a display area that displays the information. When a window maintains more information than it can display at one time, the window displays only a subset of the information. In this event, scrolling the window is necessary before a user can view the information maintained by the window that is not within the subset currently being displayed. Thus, scrolling refers to changing the subset of information displayed by a window. Scrolling is typically triggered in response to user input.

One type of scrolling in conventional systems is known as "scrolling beyond a screen boundary." This type of scrolling occurs when a user makes a selection of the information displayed by a window, and during the selection, the user moves the mouse cursor to an edge of the display area of the window. When the mouse cursor is at the edge of the display area of the window, conventional systems automatically scroll the window at a fixed speed to display more information to the user that the user can then select.

One problem that occurs when scrolling beyond a screen boundary is that the scrolling of conventional systems tends to be at a very high speed. Thus, when a user performs scrolling beyond a screen boundary wishing to select some information not currently being displayed, the user may see the desired information scroll by and out of view before the user can stop the scrolling. In this event, the user must cause the window to scroll in the reverse direction. Often times, users must scroll back and forth a number of times before being able to select the desired information. This leads to user frustration as well as a loss of user productivity.

Another type of scrolling occurs when a user hits either successive Page Down or Page Up keys. Hitting either the Page Down or the Page Up key on a keyboard, scrolls the window one window worth of information (e.g., a page) at a time in the respective direction. By scrolling one page at a time, however, the user loses their reference point in relation to the information being displayed since a completely new page of information is presented to the user. One way to solve this problem is to scroll the information one line at a time. This allows the user to see their reference point scroll by so that they can better gauge their location within the information. However, scrolling the information one line at a time uses significant processing time. Therefore, for example, when a user wants to quickly display information that is three pages away, the user must wait for the computer system to draw one line of information at a time until reaching the third page. This is time-consuming and tends to frustrate users that want to display specific information quickly.

Scrolling a window is well known. Typically, a computer program is responsible for maintaining the window and for displaying information in the window. The computer program receives the information to be displayed from a data store, such as a file. The computer program usually scrolls the window in response to a command to redraw the window. Such a command includes the level of granularity for displaying the information and the direction of scrolling. After receiving the command, the computer program will access the data store and determine which information should be displayed. For example, if the command indicated to scroll the next window-worth of information, the computer program will access the next window-worth of information from the file. After accessing the information, the computer program displays the information in the window at the level of granularity specified by the command and in the direction specified by the command.

SUMMARY OF THE INVENTION

In accordance with a first aspect of the present invention, a method for displaying contents of a window is executed in a data processing system having an input device with an input device indicator, a video display, and a computer program for displaying a window on the window display. In accordance with this method of the first aspect of the present invention, the computer program determines a location of the input device indicator on the video display, determines the acceleration of the input device indicator when the location of the input device indicator is within a predefined area of the window, designates a speed for scrolling the contents the window such that the designated speed is proportional to the acceleration and scrolls the contents of the window with the designated speed.

In accordance with a second aspect of the present invention, a method for displaying contents of a window is executed in a computer system having a video display and a computer program for displaying a window on the video display and for displaying contents within the window. In accordance with this method of the second aspect of the present invention, the computer program receives at least one request in accordance with user input to scroll the contents of the window, determines a number of requests received for scrolling the contents of the window, designates a scroll speed that is inversely proportional to the number of the requests received and scrolls the contents of the window with the designated scroll speed.

In accordance with a third aspect of the present invention, a method for displaying contents of a window is executed in a computer system having an input device and a computer program for displaying a window on a video display and for displaying contents of the window. The window has a predefined area. In accordance with this method of the third aspect of the present invention, the computer program receives at least one request from the input device to display a sequential portion of the contents in response to user input, determines a count of the number of requests received, and determines a time difference between each request received. When the count is above a predefined threshold and the time difference is below a predefined time difference, the computer program displays the contents requested by a last request received. When the count is not above the predefined threshold or when the time is not below the predefined value, the computer program displays the contents requested by each received request with a minimum granularity of a line.

DETAILED DESCRIPTION OF THE INVENTION

Figure 1:
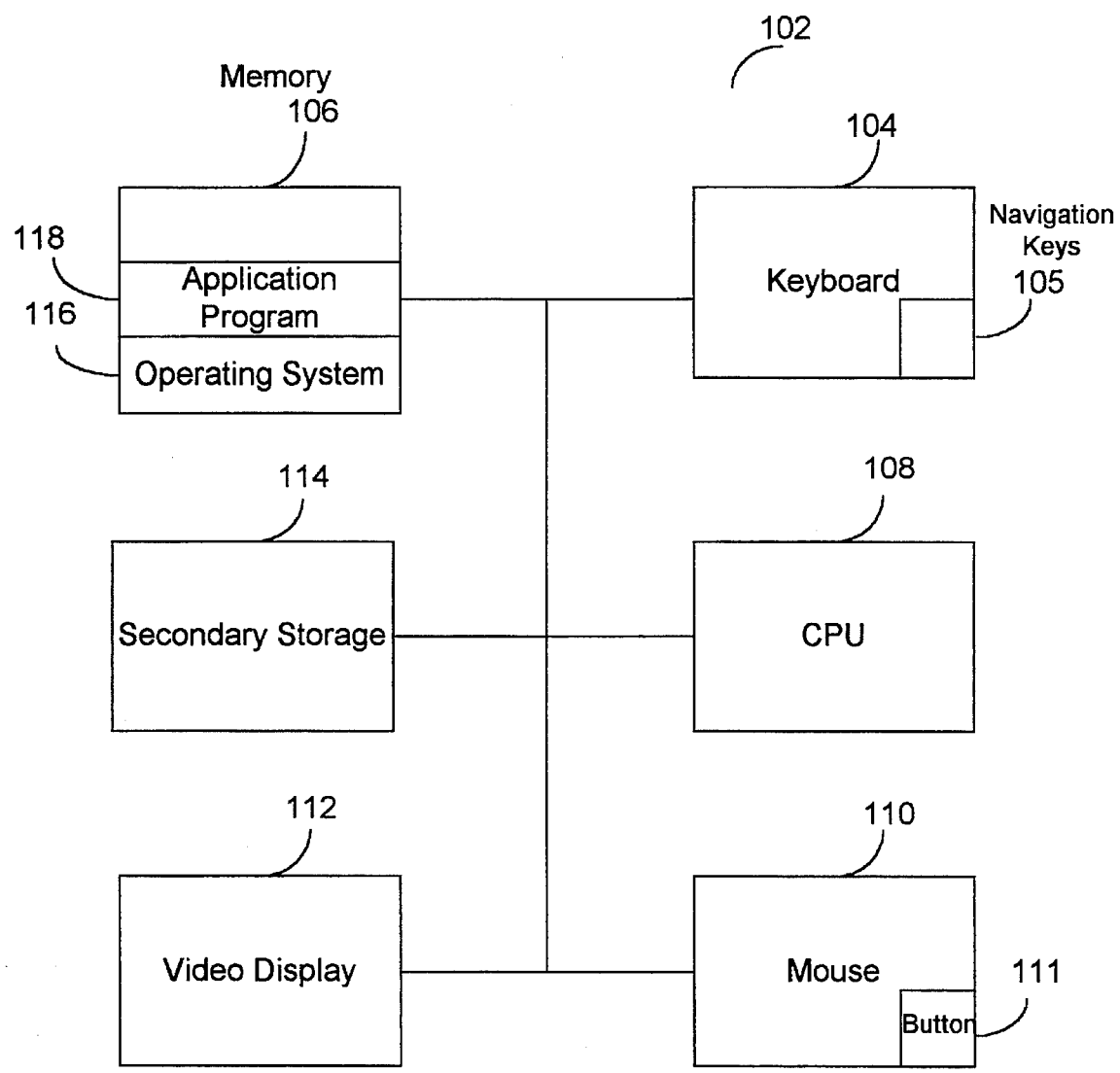
FIG. 1 is a block diagram of a data processing system that is suitable for practicing a preferred embodiment of the present invention.

The preferred embodiment of the present invention provides an improved method and system for scrolling contents of a window. There are three aspects of the preferred embodiment of the present invention which will be described herein. The first two of these aspects provide for an improvement in scrolling beyond a screen boundary. The third aspect provides for an improvement for scrolling in response to navigation key input.

The first aspect of the present invention provides variable speed scrolling when performing scrolling beyond a screen boundary. The first aspect sets the variable speed proportional to the acceleration of the mouse cursor. When invoking scrolling beyond a screen boundary, users tend to move the mouse cursor with a large magnitude of acceleration when the users wish for the window to scroll rapidly and users tend to move the mouse cursor with a magnitude of acceleration that is small when the users wish for the window to scroll slowly. Therefore, by determining a variable speed for scrolling related to the intentions of the user, the first aspect reduces user frustration and increases productivity.

The second aspect of the present invention sets a variable scroll speed while performing scrolling beyond a screen boundary based on the number of times that scrolling was initiated during the selection. The second aspect of the present invention is responsive to the intentions of the user since users tend to disengage scrolling or scroll in a reverse direction when they wish for the scrolling to slow. Thus, the second aspect sets the scrolling speed inversely proportional to the number of times that scrolling has been initiated or the direction of scrolling has been reversed. Therefore, the more a user reverses direction or disengages scrolling, the slower the window scrolls. Since the second aspect sets a scroll speed based on the intentions of the user, the second aspect reduces user frustration and increases productivity. Although the first and second aspect will be described relative to use with a mouse input device, one skilled in the art will appreciate that the present invention can be used with other input devices such as a pen input device.

The third aspect of the present invention adjusts the type of scrolling that occurs when a user uses navigation keys. The term "navigation keys" refers to keys on a keyboard input device or logical keys (or buttons) on a computer display that scroll the contents of a window. Examples of such navigation keys on a keyboard input device include the Page Up and the Page Down keys. In addition to keys on a keyboard input device, the term "navigation keys" also refers to logical keys displayed on a computer display that can be invoked by an input device such as a mouse input device. For example, some application programs display a "page-down" or a "page-up" button on a window that displays information. Such buttons are also examples of navigation keys. Typically, the most useful type of scrolling to a user is when scrolling occurs one line at a time. That is, scrolling occurs with a minimum granularity of a line. This type of scrolling is also known as "animated" scrolling. This animated scrolling allows a user to see a reference point pass by on the screen so that the user can keep their orientation with respect to the information being displayed. However, scrolling information one line at a time utilizes a significant amount of processing time and is unsuitable for users that want to go quickly to desired information. Therefore, the third aspect provides two types of scrolling ("scrolling modes"): animated scrolling and jump to scrolling. "Jump to" scrolling refers to immediately displaying the information corresponding to the last navigation key received without displaying the intervening information.

The third aspect performs animated scrolling when the user depresses a navigation key a number of times that is less than a predefined threshold or the time between depression of each navigation key ("time differential") is above a predefined value. However, if the user depresses a navigation key a number of times that is more than the predefined threshold with the time differential being less than the predefined value, the third aspect will perform jump to scrolling. For example, if a user hits the Page Down key four times successively, which is a number of times that is greater than the predefined threshold, and the time differential between each successive depression of the Page Down key is below the predefined value, the third aspect will not scroll the window in the usual sense of the term. Instead, the third aspect will display the information that would be displayed on the fourth Page Down. However, if there were a significant delay between each of the Page Down key depressions, the third aspect will scroll through the four pages one line at a time. The third aspect is responsive to the intentions of the user since a user will tend to hit a navigation key rapidly if the user wishes to go directly to a specific page. On the other hand, the user will depress the navigation keys more slowly when the user is unsure of which page of information to display and therefore, wishes to scan the information being scrolled. Therefore, since the third aspect switches between animated scrolling and jump to scrolling based on the intentions of the user, the third aspect reduces user frustration and increases productivity by allowing a user to go directly to desired information.

FIG. 1 is a block diagram of a data processing system 102 that is suitable for practicing the preferred embodiment of the present invention. The data processing system 102 includes at least one central processing unit (CPU) 108. The CPU 108 is connected to a number of peripheral devices, including a mouse 110, a keyboard 104, and a video display 112. The mouse 110 has a mouse button 111 and the keyboard 104 has navigation keys 105. The CPU 108 is also connected to a memory 106 and a secondary storage device 114, such as a hard disk drive. The memory 108 holds a copy of an operating system 116, such as the "MICROSOFT WINDOWS" operating system sold by Microsoft Corporation of Redmond, Wash., and a copy of an application program 118 such as the Microsoft Word word processing program sold by Microsoft Corporation of Redmond, Wash. The implementation of the preferred embodiment of the present invention will be described below with reference to use of scrolling within the application program 116. Nevertheless, it should be appreciated that the scrolling may alternatively be implemented in the operating system 116. In addition, the scrolling may be implemented in other application programs including, but not limited to, document processing programs, spreadsheet programs, electronic mail programs, database programs, or any other application program where information can be displayed to a user.

In general, each application program having a user interface has an associated window procedure for each window that the application program displays. For each application program having a user interface, the operating system maintains a message queue. When an event occurs, the event is translated into a message that is put into the message queue for the application program. Such an event includes keystrokes, timer events, manipulation of the mouse cursor or manipulation of the mouse button. For example, when the mouse button is depressed, a "MOUSE_DOWN" event is generated by the operating system and is sent to the message queue of the application program. The application program retrieves and delivers messages in the message queue to the proper window procedure for processing; that is, the window procedure for the window for which the event is intended. The window procedure, in turn, has a number of functions that the window procedure invokes depending on the specific event that has occurred. For example, the window procedure for the Microsoft Word word processor invokes a specific function when receiving a MOUSE_DOWN event and the mouse cursor is within the text portion of a window. Thus, this function is responsible for handling a MOUSE_DOWN event when the mouse indicator is within the text portion of the window. Since the message queue maintains the messages received from the operating system, during the processing of functions invoked from a window procedure, the functions can make requests of the message queue to retrieve messages from the message queue.

Figure 2:
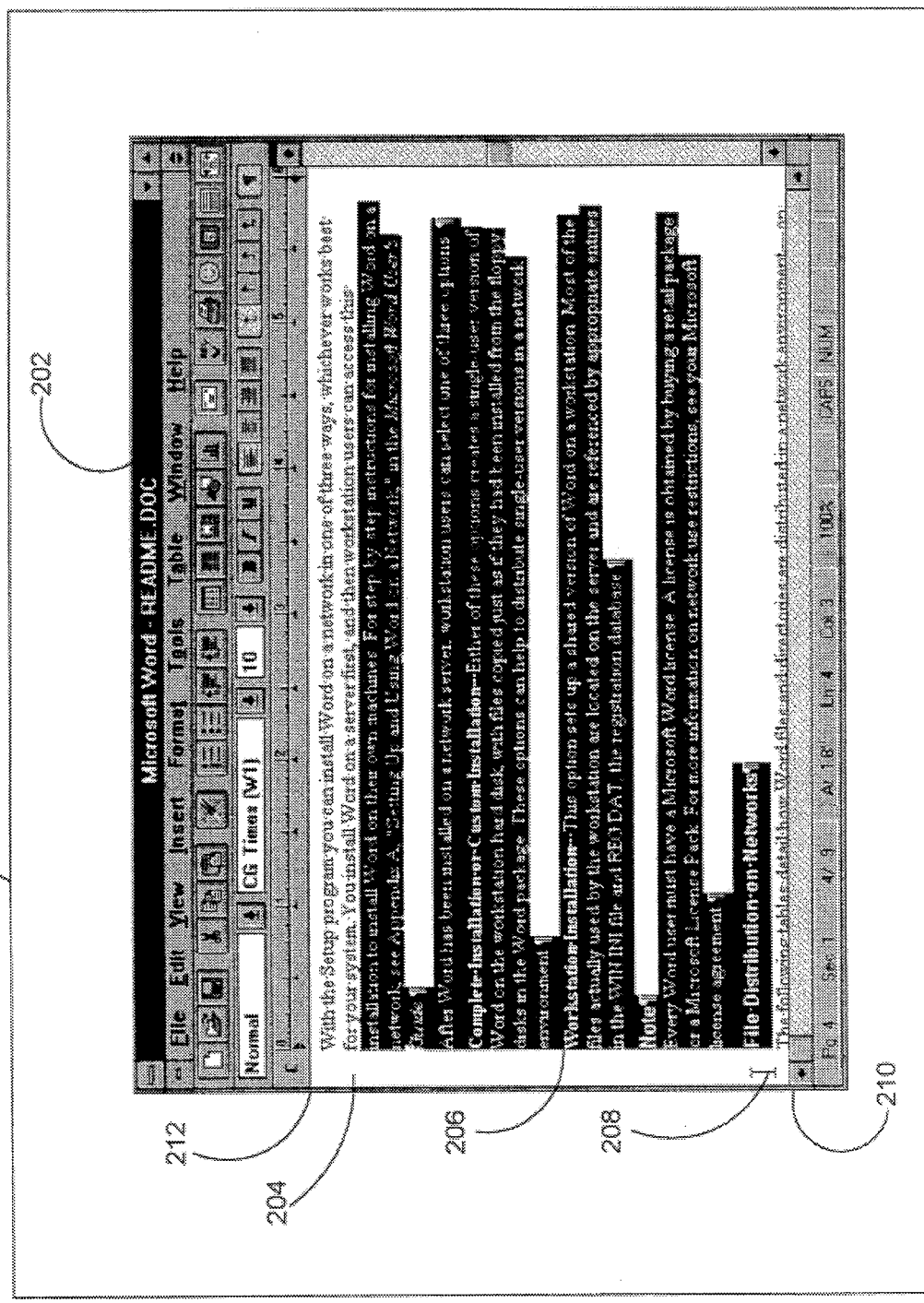
FIG. 2 depicts a window that utilizes the preferred embodiment of the present invention.

FIG. 2 depicts a window displayed on the video display 112 that utilizes the preferred embodiment of the present invention. The window 202 has a display area 204 with an upper boundary 212 and a lower boundary 210. The display area 204 is displaying text with some of the text 206 having been selected. Also depicted on the display area 204 is the mouse cursor 208. The mouse cursor 208 reflects movement of the mouse 110 on the video display 112. The selection of the text 206 is performed by moving the mouse cursor 208 to refer to a desired location within the text, depressing the mouse button 111, and moving the mouse cursor until all of the desired text is highlighted (i.e., selected). Upon releasing the mouse button 111, the text selection is completed. However, if during the selection, the mouse cursor 208 touches or moves beyond either the upper boundary 212 or the lower boundary 210, the window will scroll its contents in the respective direction (i.e., up or down). Touching or moving beyond a boundary with the mouse cursor 208 is generally referred to as being "at the screen boundary." Moving beyond the boundary includes when the mouse cursor moves beyond the border of the window. As will be further described below, the first and second aspect of the present invention adjusts the scrolling speed when scrolling occurs during a selection. With respect to the third aspect of the present invention, the third aspect switches scrolling modes based on navigation key 105 input.

Although the window utilizing the preferred embodiment of the present invention has been described as displaying text, more generally, the window utilizing the preferred embodiment displays "contents." Such contents can include screen objects or information. The term "screen objects" refers generally to any object displayed on a video display. Such objects include representations of files, folders, documents, databases, and spreadsheets. The term "information" refers to any information that can be displayed by a window including, but not limited to, text, video images, graphic data, database records, or spreadsheet cells.

Figure 3:
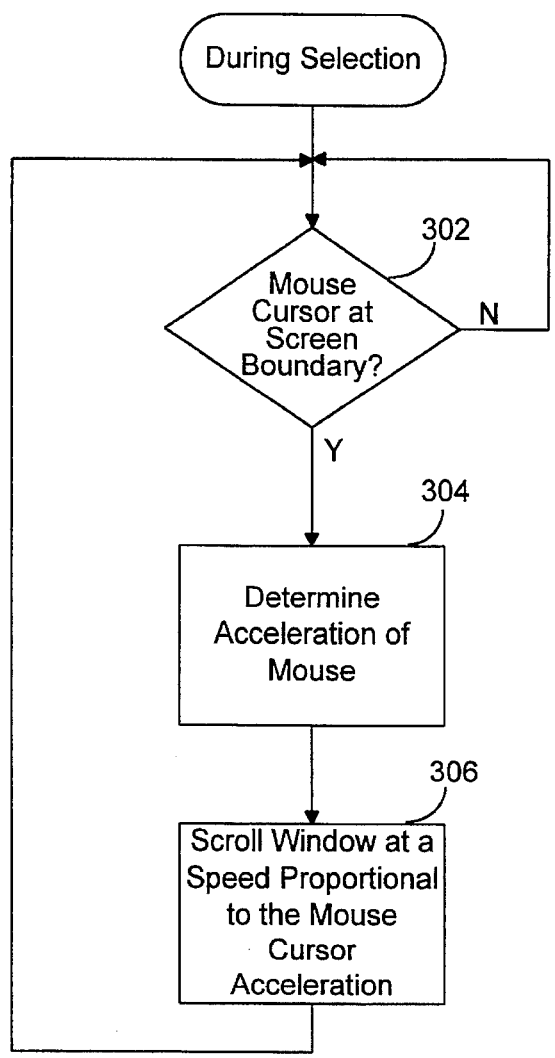
FIG. 3 is a high-level flowchart of a first aspect of the present invention.

FIG. 3 depicts a high level flowchart of the first aspect of the present invention. The first aspect of the present invention is utilized while the user is performing a selection by having the mouse button depressed. Therefore, if a user releases the mouse button to indicate the end of the selection, the first aspect automatically terminates. While the user is performing a selection, the first aspect determines whether the mouse cursor is at a screen boundary (step 302). If the mouse cursor is at a screen boundary, the first aspect determines the acceleration of the mouse cursor (step 304). After determining the acceleration of the mouse cursor, the first aspect scrolls the window at a speed proportional to the mouse cursor acceleration (step 306). This will be discussed in more detail below. If, during the processing of the first aspect, the mouse cursor is removed from the screen boundary, scrolling ends and the first aspect waits until the mouse cursor is at the screen boundary again. As previously stated, if the mouse button is released at any time during the processing of the first aspect, processing ends.

Figure 4A:
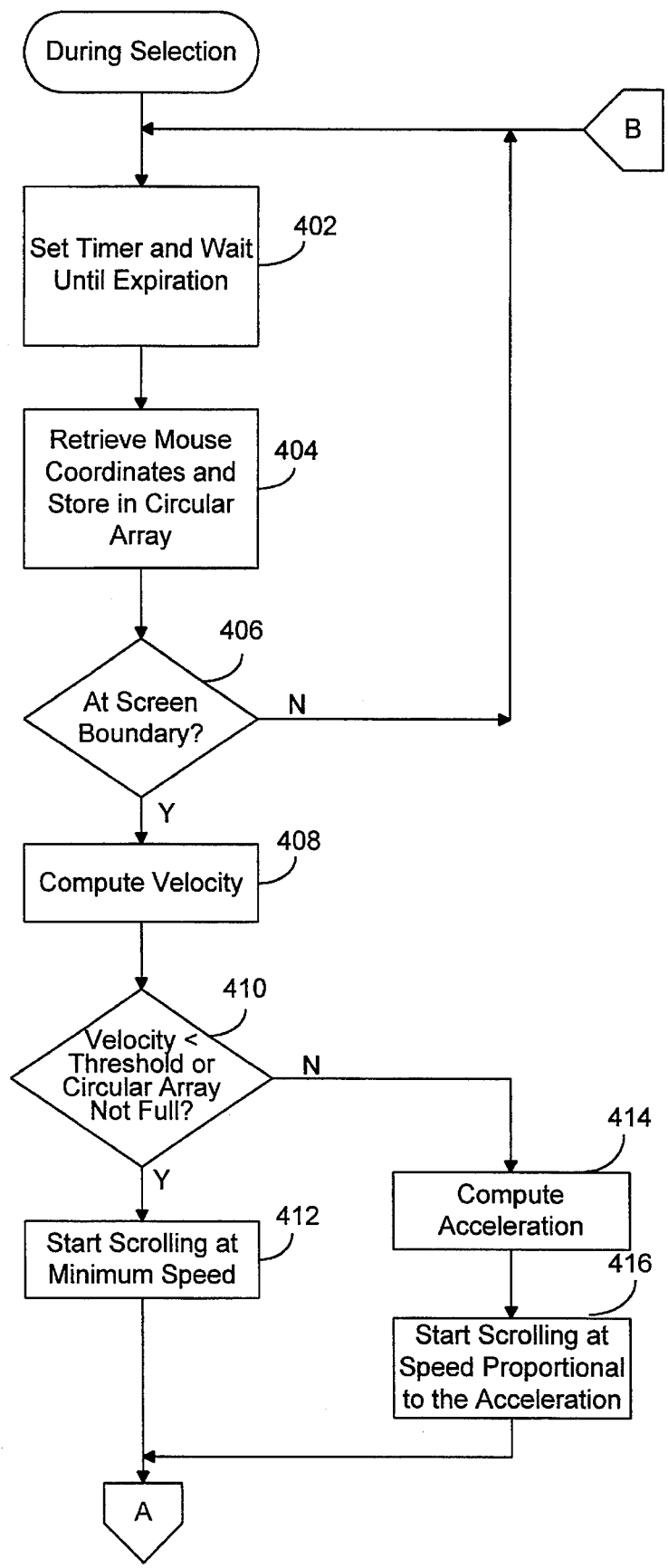
FIGS. 4A and 4B depict a more detailed flowchart of the steps performed by the first aspect of the present invention.
Figure 4B:
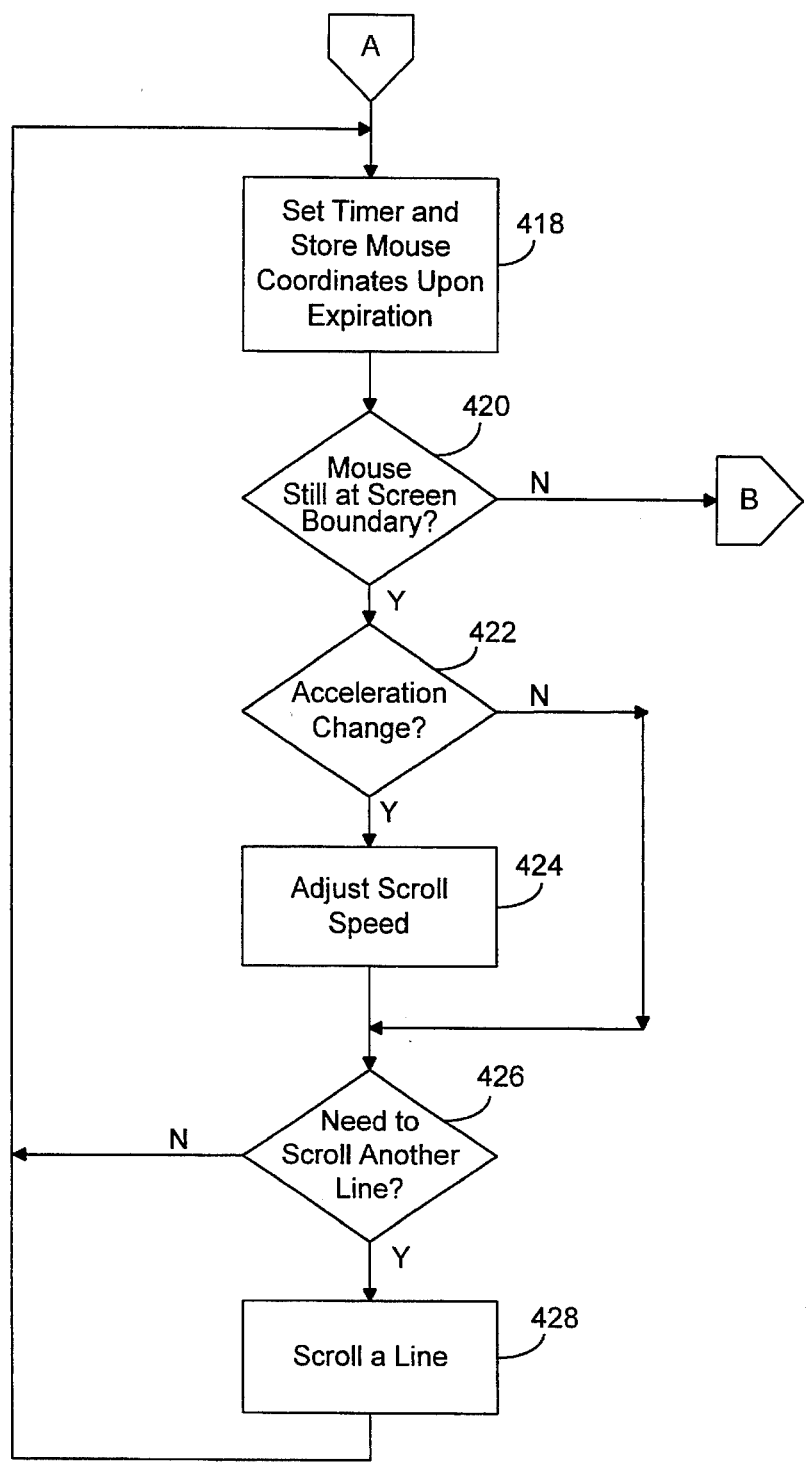

FIGS. 4A and 4B depict a flowchart of the steps performed by the first aspect of the present invention. The steps described herein are performed as part of a function invoked from a window procedure. This function is invoked when the mouse cursor is within the text area of the window and the mouse button is depressed. Steps 402–416 are performed to set an initial scrolling speed. That is, upon the invocation of scrolling an initial scrolling speed is set. Steps 418–428 are used to adjust the scrolling speed after scrolling has begun. Therefore, one skilled in the art will appreciate that the first aspect can be used to set both an initial scrolling speed as well as an adjusted scrolling speed. The first step performed by the first aspect of the present invention is to set a timer and wait until the timer expires (step 402). This step is performed so that during selection, the first aspect can be awakened periodically to perform processing. The timer is an operating system utility and is set by the first aspect to 50 milliseconds. The value of 50 milliseconds was chosen so as to reduce the impact of this processing on overall system performance. After expiration of the timer, the first aspect of the present invention retrieves the mouse coordinates and stores the mouse coordinates in a circular array (step 404). The mouse coordinates are retrieved from a message in the message queue. The "mouse coordinates" refers to the Cartesian coordinates of the mouse indicator relative to the upper left corner of the video display. Therefore, the mouse coordinates have a Y component and an X component. The circular array is maintained in the memory 106 and stores the mouse coordinates every time this step is invoked up to a maximum of three sets of mouse coordinates. Therefore, after the circular array is full, when receiving a new set of mouse coordinates, the oldest set of mouse coordinates is overwritten with the new set of mouse coordinates. The first aspect only stores the Y coordinate in the circular array, since the first aspect is only concerned with up and down scrolling. However, one skilled in the art will appreciate that the X component can be used with the present invention to scroll the window in additional or different directions.

After retrieving and storing the mouse coordinates, the first aspect determines if the mouse cursor is at the screen boundary (step 406). That is, whether the mouse cursor is at the upper boundary or the lower boundary. If the mouse cursor is not at the screen boundary, the first aspect continues to step 402. However, if the mouse cursor is at the screen boundary, the first aspect computes the velocity of the mouse cursor (step 408). Since the entries in the circular array are stored at the same time interval (i.e., 50 milliseconds between each entry), in calculating the velocity, time can be ignored (i.e., factored out). This can be done since the velocity is only being used for comparison purposes. Therefore, in this step, the velocity is calculated by determining the distance between the mouse coordinates. In calculating the distance between the mouse coordinates, only the Y component is used. After computing the velocity, the first aspect determines whether the velocity is less than a predefined threshold or whether the circular array is not full with entries (step 410). The preferred embodiment uses a predefined threshold of 1/10 of an inch per second. The predefined threshold is used so that dramatic increases in acceleration with a very low velocity do not trigger very fast scrolling. For example, if the user is moving the mouse cursor with a very low velocity and then increases the acceleration 100%, but the velocity is still relatively low, the user is probably not intending that the speed of the scrolling should increase. Rather, the user may just be feeling their way around and therefore this step is executed so as to reduce the likelihood of unwanted fast scrolling. If the velocity is less that the predefined threshold or if there are not enough entries in the circular array, the first aspect starts scrolling the contents of the window at a minimum speed (step 412). In this step, the first aspect scrolls one line, sets the scroll speed to be the minimum scroll speed and obtains the current time ("time stamp"). A "line" is a predefined amount of the display that is application specific. For example, in a word processing program, a line is a typical line of text at 1/6 of an inch. When the first aspect scrolls one line, the line is scrolled in a direction relative to the screen boundary at which the mouse cursor is located. For example, if the mouse cursor is at the upper boundary, one line will be scrolled in a downward direction. That is, a new line of information will appear at the top of the display area. The scroll speed is a variable containing the speed of scrolling currently being used by the first aspect. The minimum scroll speed is empirically chosen so as to be suitable for most users. The minimum scroll speed of the preferred embodiment is one line per second. The time stamp is an indication of the last time that a line has been scrolled and is discussed in more detail below.

If the velocity is greater than the predefined threshold and the circular array is full, the first aspect computes the acceleration of the mouse cursor (step 414). The acceleration of the mouse cursor is calculated using the following formula:

$$a = (D_3 - D_2) - (D_2 - D_1)$$

which can be reduced to the following formula:

$$a = D_3 + D_1 - (2 * D_2)$$

where "a" is the acceleration and where "$D_1$," "$D_2$," and "$D_3$" refer to the mouse coordinates as stored chronologically in the circular array. As in computing the velocity, the acceleration is computed with the time being ignored. After computing the acceleration, the first aspect starts scrolling at a scroll speed proportional to the acceleration (step 416). The scroll speed is described in Code Table Number 1 using pseudo code.

| Code Table Number 1 |
| --- |
| Max_Scroll_Speed = 18; |
| Min_Scroll_Speed = 1; |
| S = K(a − a') + s'; |
| If (S > Max_Scroll_Speed) |
|     S = Max_Scroll_Speed; |
| If (S < Min_Scroll_Speed) |
|     S = Min_Scroll_Speed; | where "Max_Scroll_Speed is the maximum allowable scroll speed of the preferred embodiment and is equivalent to 18 lines per second, "Min_Scroll_Speed" is the minimum allowable scroll speed of the preferred embodiment and is equivalent to 1 line per second, where "S" refers to the scroll speed, "K" is a proportionality constant, "a" refers to the calculated acceleration from step 414, "a'" is an empirically determined typical acceleration, and "s'" is a predefined typical scroll speed. The proportionality constant "K" is an empirically derived constant which maps the change in acceleration to a change in scroll speed. The preferred embodiment uses a unitless value of 240 for K. The preferred embodiment uses a value of 0 for a'. The predefined scroll speed, s', is the typical or default scroll speed of the present invention and is equivalent to 9 lines per second. Thus, if the user moves the mouse input device with an acceleration of 0, the first aspect will scroll the window at 9 lines per second. Therefore, in this step, the first aspect scrolls a line in a direction relative to the boundary at which the mouse cursor is located, sets the scroll speed equivalent to "S" and creates the time stamp.

After either starting to scroll at the minimum speed, or starting to scroll at a speed proportional to the acceleration, the first aspect sets a timer and stores the current mouse coordinates upon expiration of the timer (step 418 in FIG. 4B). The processing of this step is similar to that as described relative to steps 402 and 404. After the timer expires, the first aspect determines if the mouse is still at the screen boundary (step 420). If the mouse cursor is not at the screen boundary, processing continues to step 402. Otherwise, if the mouse cursor is still at the screen boundary, the first aspect determines whether the acceleration of the mouse cursor has changed (step 422). This step is performed by determining the direction that the mouse cursor is traveling and whether the mouse cursor is accelerating or decelerating. This can be determined by calculating the velocity and the acceleration as described above. After calculating the velocity and the acceleration, it is determined whether the mouse cursor has changed direction or whether the mouse cursor has accelerated in the same direction. The change of direction of the mouse cursor can be detected by determining whether the newly calculated velocity has changed sign. The mouse accelerating in the same direction can be determined by whether the newly calculated velocity has the same sign as the previous velocity and whether the newly calculated acceleration has increased. It should be noted that empirical testing has shown that a slowing of the acceleration of the mouse cursor in the same direction does not indicate that a user wishes to slow scrolling and is therefore ignored by the first aspect of the present invention. After scrolling begins, it appears that users typically slow the acceleration of the mouse cursor. If the acceleration of the mouse cursor has changed, the first aspect adjusts the scroll speed (step 424). The first aspect adjusts the scroll speed as described in Code Table Number 2.

---
Code Table Number 2

Max_Scroll_Speed = 18;
Min_Scroll_Speed = 1;
S = K2 (a − a') + s';
If (S > Max_Scroll_Speed)
    S = Max_Scroll_Speed;
If (S < Min_Scroll_Speed)
    S = Min_Scroll_Speed;

--- where "Max_Scroll_Speed" is the maximum allowable scroll speed of the preferred embodiment, where "Min_Scroll_Speed" is the minimum scroll speed of the preferred embodiment, where "S" is the new scroll speed, where "K2" is an empirically derived proportionality constant that maps a change in acceleration to a change in scroll speed, "a" is the newly calculated acceleration from step 424, "a'" is the empirically determined typical acceleration, and "s'" is the current scroll speed. The preferred embodiment uses a unitless value of 240 for K2 and a' is equivalent to 0. After adjusting the scroll speed or if the acceleration has not changed, the first aspect determines whether there is a need to scroll another line (step 426). This step is performed by checking the time stamp, which contains the last time that a line was scrolled, and comparing it against the current time. Every time a line is scrolled, the time stamp is updated by the first aspect of the present invention. In this step, the first aspect subtracts the current time from the time stamp to create a "time elapsed" value. The time elapsed value is then compared against the scroll speed to determine whether to scroll a line. For example, if the scroll speed were six lines per second (0.17 seconds per line) and the time elapsed value were less than 0.17 seconds, scrolling does not need to occur. This logic is expressed as pseudo code in code table number three.

---

Code Table 3

TE = TS − CT;
if (TE < S)
    scroll a line;

--- where "TE" is the time elapsed value, "TS" is the time stamp, "CT" is the current time and "S" is the scroll speed.

If the first aspect determines that sufficient time has passed so that a line needs to be scrolled, the first aspect scrolls a line (step 428). In this step, the first aspect updates the time stamp. After scrolling a line or if there is no need to scroll, processing continues to step 418.

Figure 5:
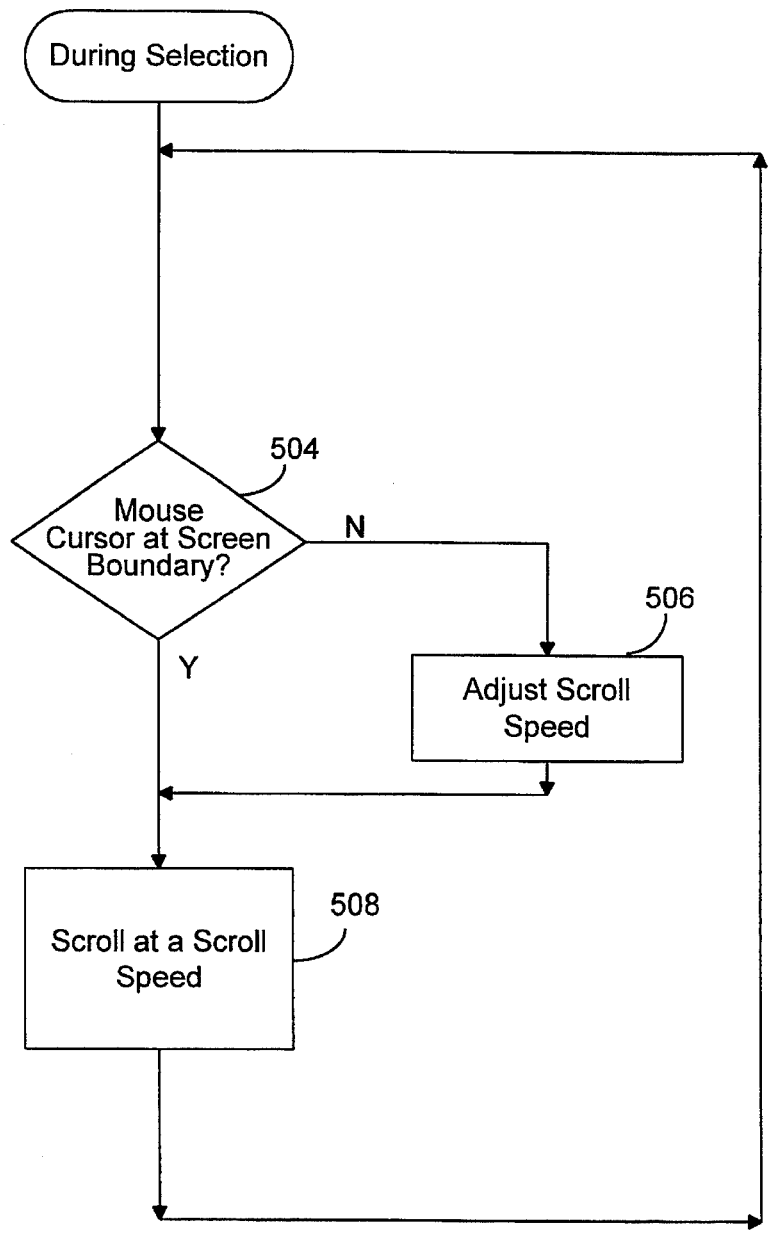
FIG. 5 is a high-level flowchart of a second aspect of the present invention.

FIG. 5 depicts a high-level flowchart of the second aspect of the present invention. The second aspect of the present invention is utilized while the user is performing a selection by having the mouse button depressed. Therefore, if a user releases the mouse button to indicate the end of the selection, the second aspect automatically terminates. While a user is performing a selection, the second aspect of the present invention scrolls at a variable speed during a selection when the mouse cursor is at the screen boundary. The variable scroll speed is set to be inversely proportional to the number of times that scrolling has previously been initiated or the direction of scrolling has reversed. The first step performed by the second aspect of the present invention is to determine whether the mouse cursor is at the screen boundary (step 504). If the mouse cursor is not at the screen boundary, the second aspect adjusts the scroll speed (step 506). The scroll speed has an initial setting based on a predefined value, which is discussed in more detail below. The second aspect adjusts the scroll speed downward and inversely proportional to the number of the times that scrolling has been initiated since the time that the selection has begun. This will be discussed in further detail below. The reason for performing this step is that when a user repeatedly engages scrolling and disengages scrolling including scrolling in another direction, these actions reliably indicate that the user is unsure of where the desired contents are located and, thus, scrolling should slow. If the mouse cursor is at the screen boundary, the second aspect scrolls at the scroll speed (step 508). In this step the second aspect either scrolls at the initial scroll speed or the scroll speed as adjusted in step 506.

Figure 6:
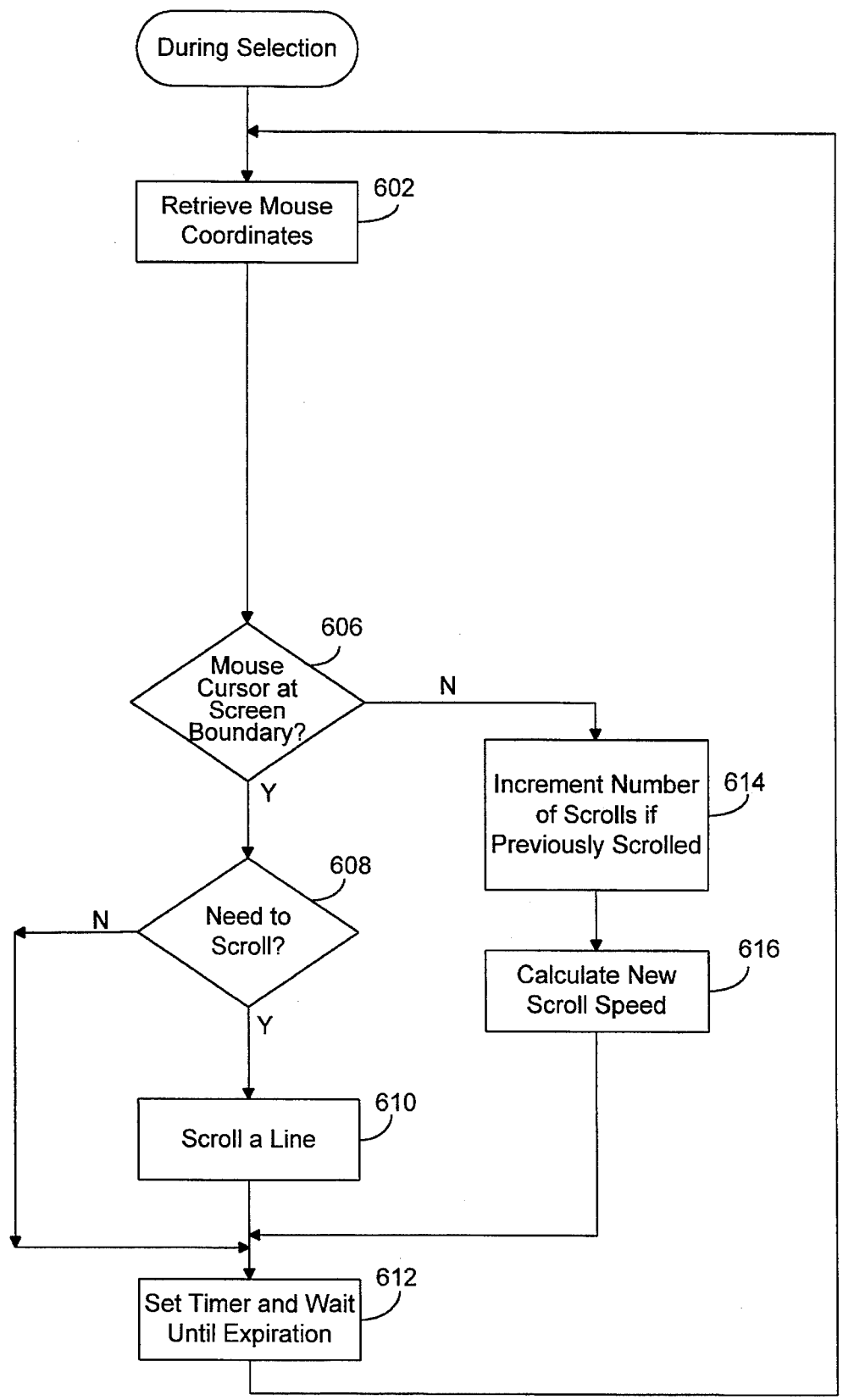
FIG. 6 depicts a more detailed flowchart of the steps performed by the second aspect d the present invention.

FIG. 6 depicts a more detailed flowchart of the steps performed by the second aspect of the present invention. The steps described herein are performed as part of a function invoked from a window procedure. This function is invoked when the mouse cursor is within the text area of the window and the mouse button is depressed. Therefore, if during the processing of the function the mouse button were released, the function would automatically terminate. The first step that the second aspect performs is to retrieve the mouse coordinates (step 602). The processing performed by this step is similar to that described relative to step 408 of FIG. 4A except that the mouse coordinates are not stored in a circular array. Instead, the mouse coordinates are merely stored in memory for later use. Next, the second aspect determines if the mouse cursor is at the screen boundary (step 606). That is, whether the mouse cursor is at the upper boundary or the lower boundary. If the mouse cursor is at the screen boundary, the second aspect determines whether it needs to scroll (step 608). The processing of this step is similar to that as described relative to step 426 of FIG. 4B. In making this determination, the second aspect uses either an initial scroll speed of 9 lines per second or a scroll speed as set in step 616, which is further described below. If the second aspect determines that it needs to scroll, the second aspect scrolls a line (step 610). The processing of this step is similar to that described relative to step 428 of FIG. 4B. If the mouse cursor is not at the screen boundary, the second aspect increments the number of scrolls, if the second aspect has previously scrolled (step 614). In other words, the second aspect maintains a count ("the number of scrolls") of the number of times that the second aspect has initiated scrolling and in this step, if the count is nonzero, it is incremented. However, the count is only incremented once after every invocation of scrolling. After incrementing the number of scrolls, the second aspect calculates a new scroll speed (step 616). In this step, the scroll speed is decreased by an amount equal to the product of multiplying 3 by the value in the count. For example, if the count were two indicating that scrolling had been initiated two times previously, the scroll speed would be decreased by 6 lines per second. However, there is a predefined minimum scroll speed below which the scrolling speed cannot be reduced. In the preferred embodiment of the present invention, this is set at 1 line per second. After calculating a new scroll speed, determining that scrolling is not needed, or after scrolling a line, the second aspect sets a timer and waits until the expiration of the timer (step 612).

Figure 7:
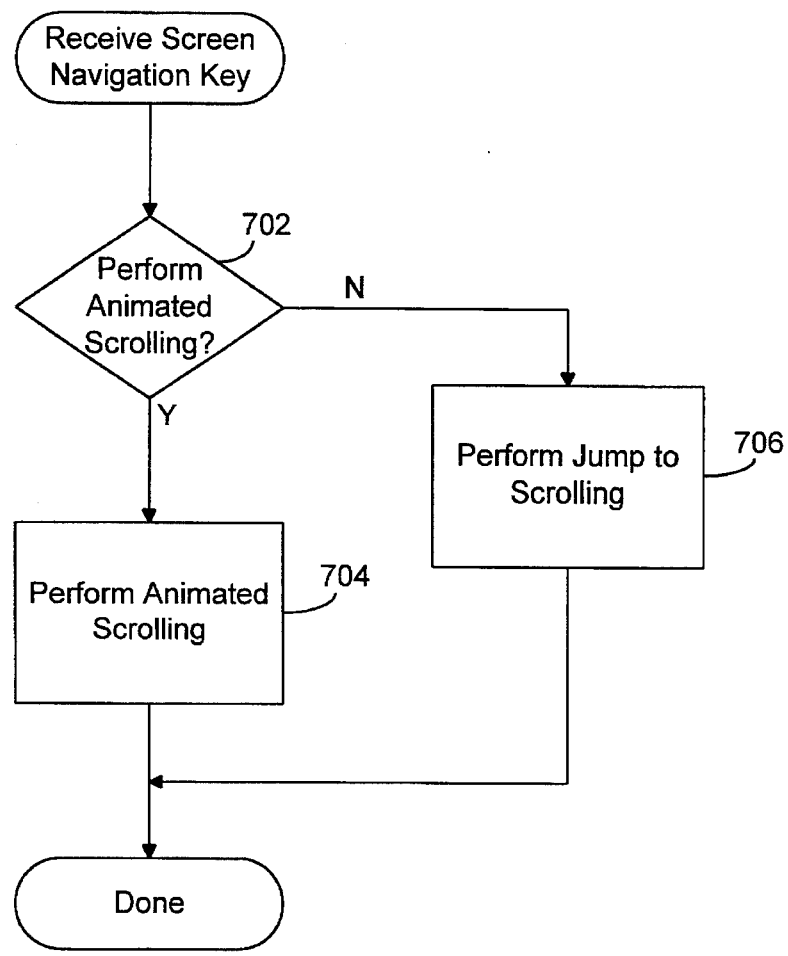
FIG. 7 depicts a high-level flowchart of a third aspect of the present invention.

FIG. 7 depicts a high level overview of the third aspect of the present invention. The third aspect of the present invention receives navigation key input and based upon the navigation key input determines whether to perform animated scrolling or whether to perform "jump to" scrolling. The third aspect makes this determination based on a predefined threshold of the number of keys in the navigation key input as well as the time differential between each key. The first step performed by the third aspect is to determine whether to perform animated scrolling (step 702). If the third aspect determines to perform animated scrolling, the third aspect performs animated scrolling by scrolling through all of the requested contents one line at a time (step 704). However, if the third aspect determines not to perform animated scrolling, the third aspect performs jump to scrolling and immediately displays the contents requested by the last navigation key in the navigation key input (step 706).

Figure 8:
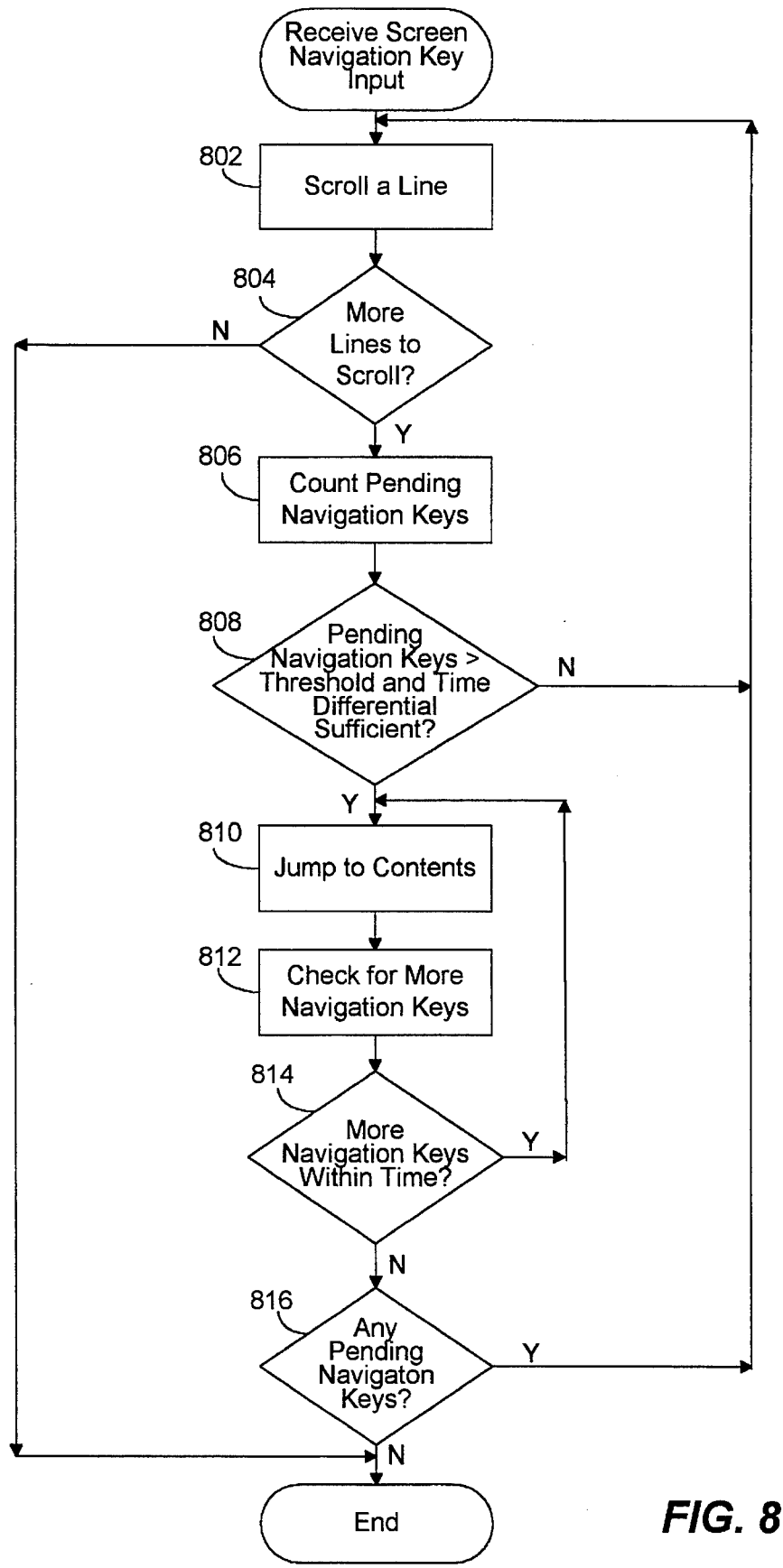
FIG. 8 depicts a more detailed flowchart of the steps performed by the third aspect of the present invention.

FIG. 8 depicts a flowchart of the steps performed by the third aspect of the present invention. The steps performed herein are performed as part of a function invoked from a window procedure. The function is invoked when the application program receives navigation key input and the function continues processing until all navigation key input that is pending in the message queue is processed. The first step performed by the third aspect of the present invention is to scroll a line (step 802). In this step, a line is scrolled in a direction relative to the type of key in the navigation key input, thereby performing animated scrolling. For example, if a page down key were in the navigation key input, the line would be scrolled in an upward direction. After scrolling a line, the third aspect determines whether there are more lines to scroll (step 804). For example, if the navigation key input were a Page Down key, a window full of contents would need to be scrolled. If there are no more lines to scroll, processing ends. However, if there are more lines to scroll, the third aspect counts the pending navigation keys (step 806). In this step, the third aspect examines the messages in the message queue to determine how many navigation keys are pending for processing. Next, the third aspect determines if the number of pending navigation keys is greater than the predefined threshold and if the time differential is less than the predefined value (step 808). The messages containing navigation key input identify the type of key depressed as well as the time that the key was depressed. Therefore, calculating the time differential for each key is performed by subtracting the times in two sequential navigation key messages. The third aspect uses three as the predefined threshold of navigation keys and 0.4 seconds as the predefined value for the time differential. If the pending navigation keys are greater than the threshold and the time differential is less than the predefined value, the third aspect jumps to the desired contents (step 810). That is, the third aspect skips over all contents requested by the pending navigation keys and immediately displays the contents requested by the last of the pending navigation keys, thereby performing jump to scrolling. For example, if there were six pending navigation keys that were each Page Down keys within the time differential, the third aspect would jump to the sixth page relative to the current contents being displayed. The third aspect then checks for more navigation keys (step 812). In this step, the third aspect checks to determine if more navigation keys have been received during the processing of the third aspect. The third aspect then determines if more navigation keys are pending that are within the time differential (step 814). If there are more navigation keys pending within the time differential, the third aspect proceeds to step 810 and jumps to the desired contents. However, if there are no more navigation keys pending within the time differential, the third aspect determines whether there are any pending navigation keys (step 816). That is, there may have been pending navigation keys received with a time differential sufficiently large so as to indicate that the user wishes to switch back to animated scrolling. If there are such pending navigation keys, processing continues to step 802 and the third aspect switches back to animated scrolling. However, if there are no pending navigation keys, the third aspect ends processing.

While the present invention has been described with reference to a preferred embodiment thereof, those skilled in the art will appreciate that various changes in form and detail may be made without departing from the intended scope of the present invention as defined in the appended claims. For example, one skilled in the art will appreciate that the three aspects of the present invention can be practiced independently, all together, or in any combination thereof.

I claim:

1. In a computer system having a video display, an input device with an input device indicator that is visible on the video display and reflects movement of the input device, and a computer program for displaying a window with contents on the video display, the window having a predefined area for triggering scrolling the contents of the window, a method for displaying the contents of a window comprising the steps of:

while the input device indicator is moving,
    determining a current location of the input device indicator on the video display;
    determining an acceleration of the input device indicator when the current location of the input device indicator is within the predefined area, wherein the input device indicator has an associated acceleration;
    designating a speed for scrolling the contents of the window such that the designated speed is non-zero and proportional to the acceleration of the input device indicator; and
    scrolling the contents of the window at the designated speed.

2. In a computer system having a video display, an input device with an input device indicator that is visible on the video display and reflects movement of the input device, and a computer program for displaying a window with contents on the video display, the window having a predefined area, a method for displaying the contents of a window comprising the steps of:

initiating selection of contents of the window;
while selecting the contents of the window with the input device in response to user input,
    determining a current location of the input device indicator on the video display;
    determining whether the current location of the input device indicator is within the predefined area; and
    when the current location of the input device indicator is within the predefined area,
        determining an acceleration of the input device indicator, wherein the input device indicator has an associated acceleration;
        designating a speed for the scrolling of the contents of the window such that the designated speed is non-zero and proportional to the acceleration of the input device indicator; and
        scrolling the contents of the window at the designated speed.

3. The method of claim 2 wherein the computer program is an operating system, wherein the contents of the window are screen objects, and wherein the step of scrolling the contents includes the step of scrolling the screen objects at the designated speed by the operating system.

4. The method of claim 2 wherein the computer program is a word processor, wherein the contents of the window is text, and wherein the step of scrolling the contents includes the step of scrolling the text at the designated speed by the word processor.

5. The method of claim 2 wherein the computer program is a database, wherein the contents of the window are database records, and wherein the step of scrolling the contents includes the step of scrolling the database records at the designated speed by the database.

6. The method of claim 2 wherein the computer program is a spreadsheet program, wherein the contents of the window are spreadsheet cells, and wherein the step of scrolling the contents includes the step of scrolling the spreadsheet cells at the designated speed by the spreadsheet program.

7. In a computer system having a video display, an input device with an input device indicator that is visible on the video display and reflects movement of the input device, and a computer program for displaying a window with contents on the video display, the input device having an associated speed and having an associated acceleration, a method for displaying the contents of the window comprising the steps of:

initiating a selection of the contents of the window with the input device in response to user input;

determining whether the input device indicator is at a window boundary; and when the input device indicator is at the window boundary, determining with the computer program whether the speed of the input device indicator is within a predefined range;

when it is determined that the speed is within the predefined range, determining the acceleration of the input device indicator;

scrolling the window by the computer program at a speed proportional to the acceleration of the input device indicator; and when it is determined that the speed is not within the predefined range, scrolling the window by the computer program at a predefined speed.

8. The method of claim 7 wherein the input device is a mouse.

9. In a computer system having a video display and a computer program for displaying a window with contents on the video display, a method for displaying contents of a window comprising the steps of:

receiving at least one request in accordance with user input to scroll the contents of the window;

determining a number of requests received for scrolling the contents of the window;

designating a scroll speed that is inversely proportional to the number of requests received; and scrolling the contents of the window at the designated scroll speed.

10. The method of claim 9 wherein the computer program is an operating system, wherein the contents of the window are screen objects, and wherein the step of scrolling the contents includes the step of scrolling the screen objects at the designated speed by the operating system.

11. The method of claim 9 wherein the computer program is a word processor, wherein the contents of the window is text, and wherein the step of scrolling the contents includes the step of scrolling the text at the designated speed by the word processor.

12. The method of claim 9 wherein the computer program is a database, wherein the contents of the window are database records, and wherein the step of scrolling the contents includes the step of scrolling the database records at the designated speed by the database.

13. The method of claim 9 wherein the computer program is a spreadsheet program, wherein the contents of the window are spreadsheet cells, and wherein the step of scrolling includes the step of scrolling the spreadsheet cells at the designated speed by the spreadsheet program.

14. In a computer system having a video display, an input device with an input device indicator that is visible on the video display and reflects movement of the input device, and a computer program for displaying a window with contents on the video display, the window having a predefined area for triggering scrolling the contents of the window, a method for displaying contents of a window comprising the steps of:

initiating a selection of contents of the window with the input device in accordance with user input;

determining a current location of the input device indicator;

determining whether the current location of the input device indicator is within the predefined area of the window;

when the current location of the input device indicator is within the predefined area of the window, determining a number of times that scrolling of the contents of the window has been initiated during the selection;

designating a scroll speed that is inversely proportional to the number of times that scrolling of the contents of the window has been initiated;

scrolling the contents of the window at the designated scroll speed; and completing the selection of the contents of the window.

15. In a computer system having a video display, an input device and a computer program for displaying a window on the video display and for displaying contents of the window, the contents having portions, the window divisible into lines of display, a method for displaying contents of a window comprising the steps of:

receiving at least one request from the input device to display a sequential portion of the contents in response to user input;

determining a count of the number of requests received;

determining a time difference between each request received;

when the count is above a predefined threshold and the time difference is below a predefined time difference, displaying the portion of the contents requested by a last request received; and when the count is not above the predefined threshold and when the time difference is not below the predefined value, displaying the portion of the contents requested by each received request with a granularity of a line of display.

16. The method of claim 15 wherein the computer program is an operating system, wherein the contents of the window are screen objects, wherein the step of receiving at least one request includes the step of receiving at least one request from the input device to display a sequential portion of the screen objects in response to user input, and wherein the step of displaying the portion of the contents requested by each received request includes the step of displaying the portion of the screen objects requested by each received request with a minimum granularity of a line of display by the operating system.

17. The method of claim 15 wherein the computer program is a word processor, wherein the contents of the window is text, wherein the step of receiving at least one request includes the step of receiving at least one request from the input device to display a sequential portion of the text in response to user input, and wherein the step of displaying the portion of the contents requested by each received request includes the step of displaying the portion of the text requested by each received request with a minimum granularity of a line of display by the word processor.

18. The method of claim 15 wherein the computer program is a database, wherein the contents of the window are database records, wherein the step of receiving at least one request includes the step of receiving at least one request from the input device to display a sequential portion of the database records in response to user input, and wherein the step of displaying the portion of the contents requested by each received request includes the step of displaying the portion of the database records requested by each received request with a minimum granularity of a line of display by the database.

19. The method of claim 15 wherein the computer program is a spreadsheet program, wherein the contents of the window are spreadsheet cells, wherein the step of receiving at least one request includes the step of receiving at least one request from the input device to display a sequential portion of the spreadsheet cells in response to user input, and wherein the step of displaying the portion of the contents requested by each received request includes the step of displaying the portion of the spreadsheet cells requested by each received request with a minimum granularity of a line of display by the spreadsheet program.

20. A device for displaying contents of a window, the device comprising:
   a selection component for selecting contents of a window in response to user input;
   a calculation component for calculating an acceleration of the selection component when the selection component is selecting contents of the window and the selection component is located within a predefined area of the window;
   a speed component for determining a speed for scrolling the contents of the window, said speed being non-zero and proportional to the calculated acceleration of the selection component; and
   a scrolling component for scrolling the contents of the window at the determined speed.

21. A device for displaying contents of a window, the device comprising:
   a receiver component for receiving requests for initiating scrolling of the contents of a window in response to user input;
   a count component for determining a number of the requests for initiating the scrolling of the contents of the window that are received by the receiver component;
   a speed component for determining a speed for scrolling the contents of the window that is inversely proportional to the number of the requests for initiating the scrolling of the contents of the window that are received by the receiver component; and
   a scrolling component for scrolling the contents of the window at the determined speed.

22. A device for displaying contents of a window, the device comprising:
   a selection component for selecting contents of a window in response to user input;
   a receiver component for receiving requests to initiate scrolling of the contents of the window;
   a count component for determining a number of the requests that are received by the receiver component while the selection component is selecting the contents of the window;
   a speed component for determining a speed for scrolling the contents of the window that is inversely proportional to the number of requests that are received by the receiver component; and
   a scrolling component for scrolling the contents of the window at the determined speed.

23. A device for scrolling contents of a window, the device comprising:
   a receiver component for receiving navigation key input from a user, said navigation key input having a magnitude;
   a threshold component for determining when the magnitude of the navigation key input is greater than a predefined threshold and for determining when the navigation key input has been received by the receiver component within a predefined time;
   an animation scrolling component for scrolling the contents of the window with a minimum granularity of a line when the threshold component determines that the magnitude of the navigation key input is not greater than the predefined threshold and when the threshold component determines that the navigation key input has not been received by the receiver component within a predefined time; and
   a jump component for displaying the contents of the window corresponding to a last of the navigation key input when the threshold component determines that the magnitude of the navigation key input is greater than the predefined threshold and the threshold component determines that the navigation key input has been received by the receiver component within a predefined time.

24. In a computer system having a video display, an input device with an input device indicator that is visible on the video display and reflects movement of the input device, and a computer program for displaying a window with contents on the video display, the input device indicator having an associated acceleration, the window having a predefined area for triggering scrolling the contents of the window, a method for displaying the contents of a window comprising the steps of:
   initiating a first selection of the contents of the window;
   while performing the first selection,
      determining a first current location of the input device indicator on the video display;
      determining a first acceleration of the input device indicator when the first current location of the input device indicator is within the predefined area;
      designating a first speed for scrolling the contents of the window such that the first speed is non-zero and proportional to the first acceleration of the input device indicator;
      scrolling the contents of the window at the first speed;
   initiating a second selection of the contents of the window; and
   while performing the second selection,
      determining a second current location of the input device indicator on the video display;
      determining a second acceleration of the input device indicator when the second current location of the input device indicator is within the predefined area;

designating a second speed for scrolling the contents of the window such that the second speed is non-zero and proportional to the second acceleration of the input device indicator; and scrolling the contents of the window at the second speed.

25. In a computer system having a video display, an input device with an input device indicator that is visible on the video display and reflects movement of the input device, and a computer program for displaying a window with contents on the video display, the input device indicator having an associated acceleration, the window having a predefined area for triggering scrolling the contents of a window, a method for displaying the contents of a window comprising the steps of:

initiating a selection of the contents of the window;

while performing the selection, determining a first current location of the input device indicator on the video display;

determining a first acceleration of the input device indicator when the first current location of the input device indicator is within the predefined area;

designating a first speed for scrolling the contents of the window such that the first speed is non-zero and proportional to the first acceleration of the input device indicator;

scrolling the contents of the window at the first speed;

determining a second current location of the input device indicator on the video display;

determining a second acceleration of the input device indicator when the second current location of the input device indicator is within the predefined area;

designating a second speed for scrolling the contents of the window such that the second speed is non-zero and proportional to the second acceleration of the input device indicator; and scrolling the contents of the window at the second speed.

26. In a computer system having a video display, an input device with an input device indicator that is visible on the video display and reflects movement of the input device, and a computer program for displaying a window with contents on the video display, the window having a predefined area, a method for displaying the contents of a window comprising the steps of:

selecting contents of the window with the input device in response to user input;

determining a current location of the input device indicator on the video display;

determining whether the current location of the input device indicator is within the predefined area; and when the current location of the input device indicator is within the predefined area, determining an acceleration of the input device indicator, wherein the input device indicator has an associated acceleration;

designating a speed for the scrolling of the contents of the window such that the designated speed is non-zero and proportional to the acceleration of the input device indicator; and scrolling the contents of the window at the designated speed.

* * * * *